(12) United States Patent
Jang et al.

(10) Patent No.: US 9,904,093 B2
(45) Date of Patent: Feb. 27, 2018

(54) DISPLAY APPARATUS

(71) Applicant: Samsung Display Co., LTD., Yongin-si, Gyeonggi-Do (KR)

(72) Inventors: Hyeonggyu Jang, Asan-si (KR); Moongyu Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 40 days.

(21) Appl. No.: 15/019,269

(22) Filed: Feb. 9, 2016

(65) Prior Publication Data

US 2016/0282663 A1    Sep. 29, 2016

(30) Foreign Application Priority Data

Mar. 26, 2015  (KR) .................... 10-2015-0042386

(51) Int. Cl.
| | | |
|---|---|---|
| G02F 1/1335 | (2006.01) | |
| H04N 7/14 | (2006.01) | |
| H04N 7/18 | (2006.01) | |
| G06F 3/01 | (2006.01) | |
| H04N 5/247 | (2006.01) | |

(52) U.S. Cl.
CPC .. *G02F 1/133504* (2013.01); *G02F 1/133606* (2013.01); *G02F 1/133611* (2013.01); *G06F 3/013* (2013.01); *H04N 5/247* (2013.01); *H04N 7/144* (2013.01); *H04N 7/18* (2013.01); *G02F 1/13362* (2013.01); *G02F 1/133528* (2013.01); *G02F 2001/133567* (2013.01)

(58) Field of Classification Search
CPC .. G02F 1/133504; G02F 2001/133567; H04N 7/18; H04N 5/247; G06F 3/013
See application file for complete search history.

(56) References Cited

U.S. PATENT DOCUMENTS

| | | | |
|---|---|---|---|
| 5,990,976 A | 11/1999 | Higashida | |
| 6,175,399 B1 * | 1/2001 | Mitsui | C09K 19/544 349/113 |
| 6,798,457 B2 | 9/2004 | Boyden et al. | |
| 8,817,176 B2 | 8/2014 | Yu | |
| 2005/0018106 A1 * | 1/2005 | Wang | G02F 1/133502 349/96 |

(Continued)

FOREIGN PATENT DOCUMENTS

| | | |
|---|---|---|
| KR | 1020090101156 A | 9/2009 |
| KR | 1020120085920 A | 8/2012 |

(Continued)

*Primary Examiner* — Christopher K Peterson
(74) *Attorney, Agent, or Firm* — Cantor Colburn LLP

(57) ABSTRACT

A display apparatus includes a display panel, a backlight unit, and a capturing unit. The display panel includes a polarizing plate having a first polarizing axis parallel to a first direction, an isotropic diffuser including an anisotropic region having a transmission axis parallel to the first direction and a diffusing axis parallel to a second direction perpendicular to the first direction, and a liquid crystal layer interposed between the polarizing plate and the anisotropic diffuser. The backlight unit is disposed at a rear side of the anisotropic diffuser and generates a first light linearly polarized in the second direction. The capturing unit is disposed at a rear side of the anisotropic region and captures an image of a subject at a front side of the display panel.

20 Claims, 9 Drawing Sheets

(56) References Cited

U.S. PATENT DOCUMENTS

2009/0102763 A1* 4/2009 Border ................ H04N 7/144
                                                    345/87
2012/0257004 A1   10/2012 Smith et al.
2014/0111420 A1*  4/2014 Ahn ................... G06F 3/167
                                                    345/156

FOREIGN PATENT DOCUMENTS

| KR | 1020130083153 A | 7/2013 |
| KR | 1020130101994 A | 9/2013 |
| KR | 1020130111268 A | 10/2013 |
| KR | 1020140092784 A | 7/2014 |
| KR | 1020160091514 A | 8/2016 |

* cited by examiner

DISPLAY APPARATUS

This application claims priority to Korean Patent Application No. 10-2015-0042386, filed on Mar. 26, 2015, and all the benefits accruing therefrom under 35 U.S.C. § 119, the content of which in its entirety is herein incorporated by reference.

BACKGROUND

1. Field

The disclosure herein relates to a display apparatus, and particularly to, a display apparatus making eye-to-eye communication possible.

2. Description of the Related Art

A liquid crystal display apparatus is one of many widely used type of flat panel display apparatus. The liquid crystal display apparatus may be used to display an image on various apparatuses such as a television, a monitor, a notebook or a mobile phone, for example.

The liquid crystal display apparatus typically includes a liquid crystal display panel for displaying an image and a backlight unit for providing light to a liquid crystal display panel. The liquid crystal display panel displays an image by adjusting the strength of electric field applied to a liquid crystal layer interposed between two substrates, and the amount of light transmitted through the two substrates.

The liquid crystal display apparatus may further include a capturing unit capable of capturing an image of the outside. In general, the capturing unit is disposed in a bezel area not to overlap a display part of the liquid crystal display panel.

SUMMARY

The disclosure provides a display apparatus capable of eye-to-eye communication.

Exemplary embodiments of the invention provide a display apparatus including: a display panel including a polarizing plate having a first polarizing axis parallel to a first direction, an anisotropic diffuser including an anisotropic region having a transmission axis parallel to the first direction and a diffusing axis parallel to a second direction perpendicular to the first direction, and a liquid crystal layer interposed between the polarizing plate and the anisotropic diffuser; a backlight unit disposed at a rear side of the anisotropic diffuser and which generates a first light linearly polarized in the second direction; and a capturing unit disposed at a rear side of the anisotropic region and which captures an image of a subject at a front side of the display panel.

In an exemplary embodiment, the polarizing plate may transmit the image of the subject polarized in a direction parallel to the transmission axis to the anisotropic diffuser side, and the anisotropic diffuser may transmit the image of the subject polarized in the direction parallel to the transmission axis to the capturing unit side and may diffuse a component of the first light received from the backlight unit which is polarized parallel to the diffusing axis to provide to the liquid crystal layer.

In an exemplary embodiment, the display panel may further include a non-display part and a display part which displays an image and corresponds to the display region, and the capturing unit may be disposed corresponding to the display region.

In an exemplary embodiment, the anisotropic region may include a base and a plurality of first diffusing particles, the base may have first to third base refractive indices respectively in the first and second directions and a third direction perpendicular to the first and second directions; the diffusing particles may respectively have first to third particle refractive indices in the first to third directions, respectively; the first and third particle refractive indices may be substantially the same as the first and third base refractive indices, and the second refractive index may be different from the second base refractive index.

In an exemplary embodiment, the base may have an isotropic refractive index, and the first to third base refractive indices may be substantially the same as each other.

In an exemplary embodiment, the first diffusing particles may be randomly dispersed in the base.

In an exemplary embodiment, distances between the diffusing particles may be in a range of about 1 micrometer (μm) to about 1000 μm.

In an exemplary embodiment, diameters of the first diffusing particles may be in a range of about 100 nanometers (nm) to about 100 μm.

In an exemplary embodiment, the capturing unit overlaps the anisotropic region when viewed from a front view, and the anisotropic region may be defined to correspond to a first region of the display region.

In an exemplary embodiment, the diffusing plate may include an isotropic region corresponding to a second region of the display region, which is not overlapping the first region, the isotropic region may further include a plurality of second diffusing particles, and refractive indices of the second diffusing particles are different from refractive indices of the first diffusing particles.

In an exemplary embodiment, each of the second diffusing particles may respectively have fourth to sixth particle refractive indices in the first to third directions, respectively, and the fourth to sixth particle refractive indices may be different from the first to third base refractive indices.

In an exemplary embodiment, the second diffusing particles may have an isotropic refractive index.

In an exemplary embodiment, the second diffusing particles may have refractive indices different from the base refractive index in the first to third directions.

In an exemplary embodiment, the display panel may further include a non-display part and a display part which displays an image and corresponds to a display region, the display part may include a first part and a second part, and the capturing unit may include a first sub-capturing unit disposed to overlap the first part when viewed from a front view and a second sub-capturing unit disposed to overlap the second part when viewed from the front view.

In an exemplary embodiment, the display apparatus may further include a tracking unit including a viewing line detection part which detects a viewing line of a user, a viewing line determination part which generates a viewing signal including viewing information on a viewing part of the user between the first and second parts, based on the detected viewing line of the user, and the first and second sub-capturing units may receive the viewing signal and may be driven by the viewing signal.

In an exemplary embodiment, the first sub-capturing unit may capture the image of the subject, when the user views the first part, in response to the viewing signal; and the second sub-capturing unit may capture the image of the subject, when the user views the second part, in response to the viewing signal.

In an exemplary embodiment, the display panel may include an upper plate interposed between the liquid crystal layer and the polarizing plate, and a lower plate interposed between the liquid crystal layer and the anisotropic diffuser;

the polarizing plate may be disposed on an upper surface of the upper plate; and the anisotropic diffuser may be disposed on a lower surface of the lower plate.

In an exemplary embodiment, the display apparatus may further include a capture polarizing plate, which is disposed between the anisotropic diffuser and the capturing unit, where the capture polarizing plate overlaps the capturing unit when viewed from a front view, and has a capture polarizing axis parallel to the first direction.

In an exemplary embodiment, the backlight unit may include a light source which generates a second light; and a polarizing unit which has a second polarizing axis parallel to the second direction, receives the second light, and polarizes the second light to the first light.

In an exemplary embodiment, the backlight unit may include a polarizing light source which generates the first light.

BRIEF DESCRIPTION OF THE DRAWINGS

The above and other features of the invention will become readily apparent by reference to the following detailed description when considered in conjunction with the accompanying drawings, in which.

DETAILED DESCRIPTION

Figure 1:
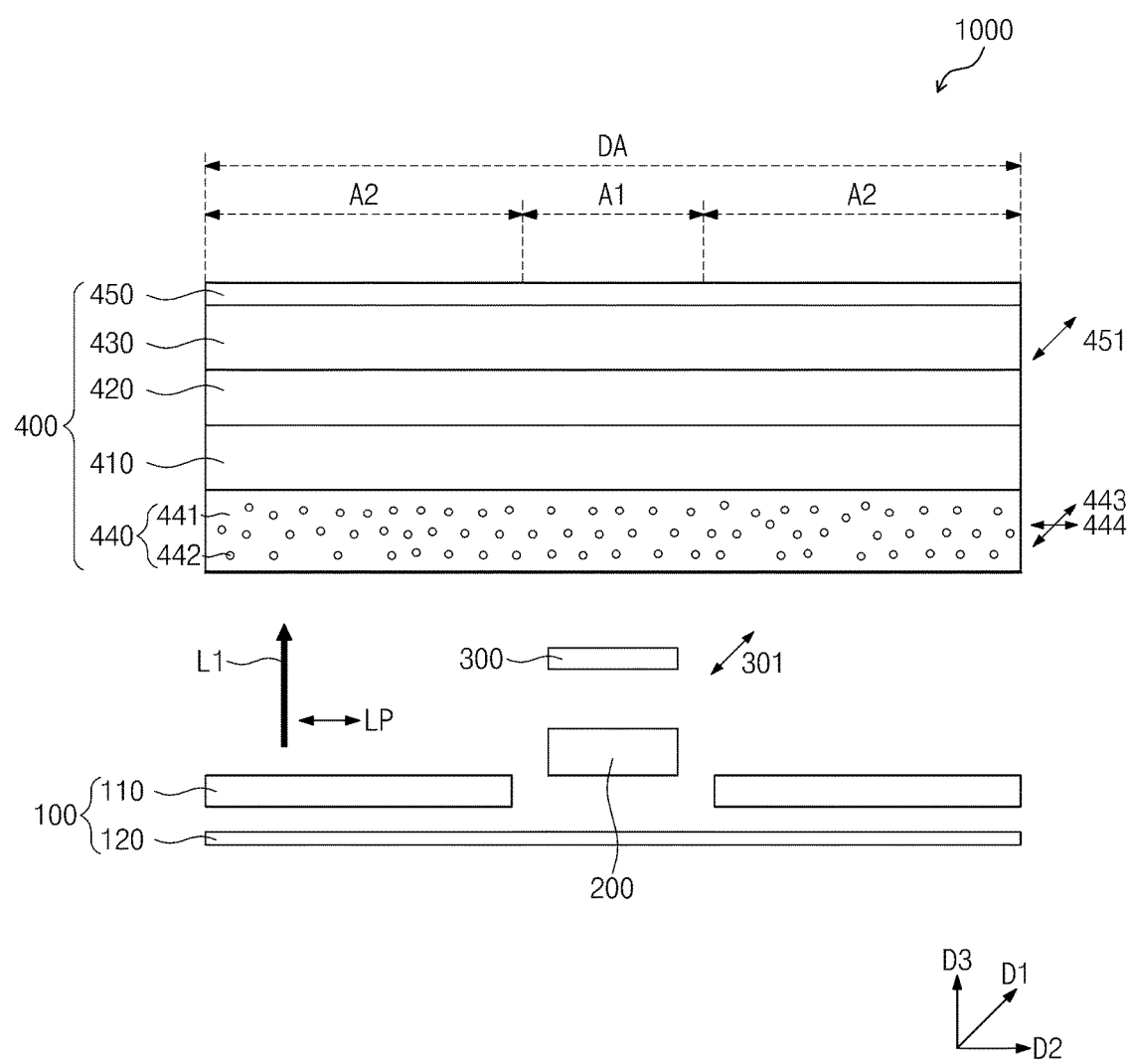
FIG. 1 is a cross-sectional view illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure. The terms in singular form include the plural form unless otherwise specified.

As used herein, the terms "includes" or "has" indicate the presence of characteristics, numbers, steps, operations, components, parts or combinations thereof represented in the disclosure but do not exclude the presence or addition of one or more other characteristics, numbers, steps, operations, components, parts or combinations thereof. Also, when a component such as a layer, a film, an area, or a plate is referred to as being "on" another component, it may be directly on the other component or intervening components may be in between. Similarly, when a component such as a layer, a film, an area, or a plate is referred to as being "under" another component, it may be directly under the other component or intervening components may be in between.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in more detail with reference to the accompanying drawings.

FIG. 1 is a cross-sectional view illustrating an exemplary embodiment of a display apparatus according to the invention.

Referring to FIG. 1, an exemplary embodiment of a display apparatus 1000 includes a backlight unit 100 that outputs a first light L1, a capturing unit 200 that captures an image, a capture polarizing plate 300, and a display panel 400 that displays an image.

The display panel 400 includes a lower plate 410, an upper plate 430 disposed opposite to, e.g., facing, the lower plate 410, and a liquid crystal layer 420 interposed between the lower plate 410 and the upper plate 430. In such an embodiment, the display panel 400 further includes an anisotropic diffuser 440 disposed on, e.g., attached to, a lower surface of the lower plate 410 and a polarizing plate 450 disposed on, e.g., attached to, an upper surface of the upper plate 430.

The display panel 400 includes a display part (not shown) corresponding to a display region DA, and a non-display part (not shown) corresponding to a non-display region (not shown) defined adjacent to a side of the display region DA. A pixel PX (see FIG. 2) is defined in the display part, and the display part displays an image through the pixel PX. The pixel PX will be described later in detail with reference to FIG. 2. The non-display part may be disposed adjacent to the display part. A wiring or a driving part for driving the pixel PX may be included in the non-display part.

The polarizing plate 450 includes a first polarizing axis 451 parallel to a first direction D1. The polarizing plate 450 only transmits, among the components of the incident light, a component polarized parallel to the first polarizing axis 451, and absorbs or reflects a component polarized parallel to a second direction D2 perpendicular to the first direction D1.

The polarizing plate 450 may be manufactured by, for example, adsorbing iodine, which is a dichromatic pigment or dichromatic dye, to a polyvinyl alcohol-based resin film, and then stretching and aligning the resin film in a stretching direction.

The display region DA includes a first region A1 and a second region A2 not overlapping the first region A1. In an exemplary embodiment of the invention, the second region A2 surrounds the first region A1.

The capturing unit 200 may be disposed at a rear side of the display panel 400 corresponding to the first region A1. In such an embodiment, the capturing unit 200 may be disposed to overlap the display region DA of the display panel 400, on which the image is displayed, when viewed from a front view. Herein, the front view is a view from a front side of the display panel 400 in a direction substantially parallel to the thickness direction of the display panel 400.

The capturing unit 200 may capture an image of an object or a subject positioned at a front side of the display panel 400 and received through the display panel 400. In such an embodiment, the capturing unit 200 is disposed at a rear side of the display panel 400, such that the capturing unit 200 receives the image of the subject through the display panel 400, and may capture the image of the subject.

The capturing unit 200 is an optical device that converts the optical signal into an electrical signal. In one exemplary embodiment, for example, the capturing unit 200 may include a charge coupled device ("CCD").

The anisotropic diffuser 440 is interposed between the capturing unit 200 and the liquid crystal layer 420. In one exemplary embodiment, for example, the anisotropic diffuser 440 may be disposed on, e.g., attached to, a lower surface of the lower plate 410. The anisotropic diffuser 440 diffuses the first light L1 emitted from the backlight unit 100 and may improve brightness uniformity. The anisotropic diffuser 440 may have, for example, a plate shape corresponding to the shape of the display panel 400.

The anisotropic diffuser 440 includes a base 441 and diffusing particles 442. The base 441 includes or is formed of a transparent polymer resin. In one exemplary embodiment, for example, the base 441 is formed of a transparent polymer resin with transmittance of about 90% or more and less than about 100%. In such an embodiment, the transparent polymer resin may include at least one selected from polyethylene terephthalate ("PET"), polyethylene naphthalate ("PEN"), and polycarbonate ("PC").

The diffusing particles 442 may include, for example, a polymer resin such as a copolymer of PEN ("coPEN").

The diffusing particles 442 may be entirely dispersed in the base 441, but the invention is not limited thereto. In an alternative exemplary embodiment, the anisotropic diffuser 440 includes a light diffusing layer (not shown), in which the diffusing particles 442 are dispersed, disposed on the base 441. In such an embodiment, the light diffusing layer may be formed by dispersing the diffusing particles 442 in a resin having adhering force, and applying the resin including the dispersed diffusing particles 442 to a surface of the base 441. In one exemplary embodiment, for example, the resin may include at least one selected from silicon resin, epoxy resin and acrylate resin.

The anisotropic diffuser 440 includes a transmission axis 443 and a diffusing axis 444. The anisotropic diffuser 440 transmits a component of light polarized parallel to the transmission axis 443, and diffuses a component of light polarized parallel to the diffusing axis 444. In an exemplary embodiment of the invention, the transmission axis 443 may be parallel to the first direction D1, and the diffusing axis 444 may be parallel to the second direction D2. The transmission axis 443 and the diffusing axis 444 may be determined by a refractive index of the base and the refractive indices of the diffusing particles 442. The transmission axis 443 and the diffusing axis 444 will be described later in greater detail with reference to FIG. 3.

The backlight unit 100 includes a light source unit 110 that generates a first light L1 and a reflective plate 120.

In an exemplary embodiment of the invention, the backlight unit 100 is a direct type. In such an embodiment, the light source unit 110 is disposed at a rear side of the display panel 400, and the reflective plate 120 is disposed at a rear side of the light source unit 110. The light source unit 110 is disposed corresponding to the second region A2 and may not be in the first region A1 not to overlap the capturing unit 200 when viewed from a front view.

In an exemplary embodiment, the first light L1 is linearly polarized light in the second direction D2. In such an embodiment, the polarized light of the first light L1 includes only a component linearly polarized in the second direction D2.

The reflective plate 120 reflects light leaking to the lower portion of the light source unit 110 toward the display panel 400, thereby improving the use efficiency of the first light L1. In one exemplary embodiment, for example, the reflective plate 120 may include or be formed of polyethylene terephthalate or polycarbonate material with a high reflectivity.

The capture polarizing plate 300 is disposed between the anisotropic diffuser 440 and the capturing unit 200. The capture polarizing plate 300, for example, may be corresponding to the first region A1, e.g., disposed to overlap the first region A1 when viewed from a front view. In an exemplary embodiment of the invention, the capture polarizing plate 300 may be attached to a lens (not shown) of the capturing unit 200. The capture polarizing plate 300 defines a capture polarizing axis 301 parallel to the first direction D1. The capture polarizing plate 300 transmits only the light incident to the capturing unit 200 and polarized in the first direction D1 toward the capturing unit 200.

Figure 2:
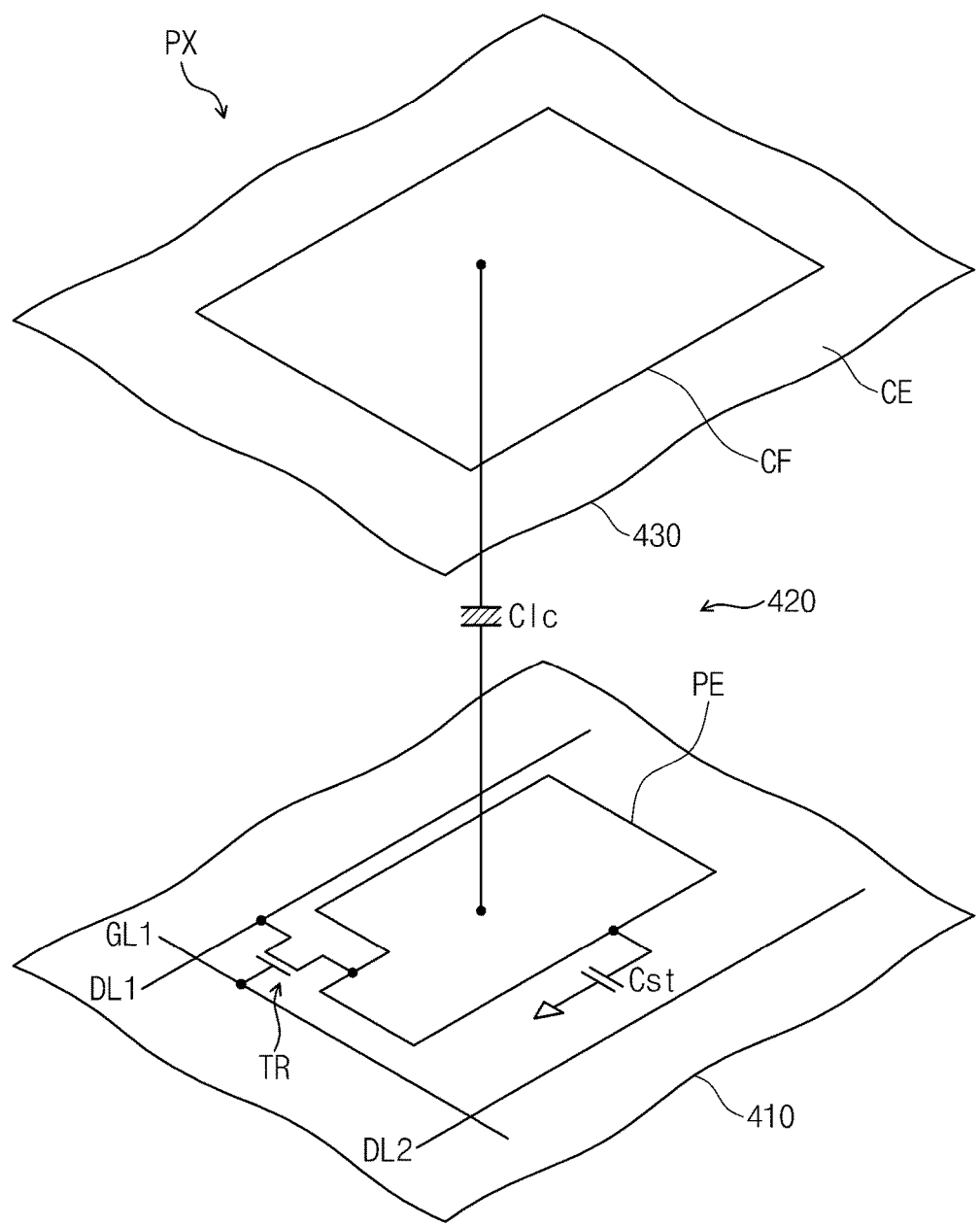
FIG. 2 is an equivalent circuit diagram of an exemplary embodiment of a pixel of the display apparatus illustrated in FIG. 1.

FIG. 2 is an equivalent circuit diagram of an exemplary embodiment of a pixel of the display apparatus illustrated in FIG. 1.

For convenience of illustration and description, a pixel PX connected to a first gate line GL1 and a first data line DL1 is illustrated in FIG. 2.

Referring to FIG. 2, an exemplary embodiment of the pixel PX includes a transistor TR connected to the first gate line GL1 and the first data line DL1, a liquid crystal capacitor Clc connected to the transistor TR, and a storage capacitor Cst connected in parallel to the liquid crystal capacitor Clc. In an alternative exemplary embodiment, the storage capacitor Cst may be omitted.

In an exemplary embodiment, the transistor TR may be disposed on the lower plate 410. The transistor TR includes a gate electrode connected to the first gate line GL1, a source electrode connected to the first data line DL1, and a drain electrode connected to the liquid crystal capacitor Clc and the storage capacitor Cst.

In an exemplary embodiment, the liquid crystal capacitor Clc includes a pixel electrode PE disposed on the lower plate 410, a common electrode CE disposed on the upper plate 430, and a liquid crystal layer 420 disposed between the pixel electrode PE and the common electrode CE. In such an embodiment, the liquid crystal layer 420 functions as a dielectric. The pixel electrode PE is connected to the drain electrode of the transistor TR.

The pixel electrode PE may be corresponding to the pixel region (not shown) defined between the first data line DL1 and the second data line DL2 disposed adjacent to the first data line DL1 in one direction.

In an exemplary embodiment, the common electrode CE may be entirely formed on the upper plate 430, but the invention is not limited thereto. In an alternative exemplary embodiment, the common electrode CE may be disposed on the lower plate 410. In such an embodiment, a horizontal electric field between the pixel electrode PE and the common electrode CE may be used.

The storage capacitor Cst may include the pixel electrode PE, a storage electrode (not shown) branched from a storage line (not shown), and an insulation layer disposed between the pixel electrode PE and the storage electrode. The storage line is disposed on the lower plate 410, and may be formed together with the first gate line GL1 on a same layer. The storage electrode may partially overlap the pixel electrode PE.

The pixel PX may further include a color filter CF for expressing one of the primary colors. In an exemplary embodiment, the color filter CF may be disposed on the upper plate 430, but the invention is not limited thereto. In an alternative exemplary embodiment, the color filter CF may be disposed on the lower plate 410.

In such an embodiment, the transistor TR is turned on in response to a gate signal received through the first gate line GL1. A data voltage received through the first data line DL1 is provided to the pixel electrode PE of the liquid crystal capacitor Clc through the turned-on transistor TR. A common voltage is applied to the common electrode CE.

An electric field is generated between the pixel electrode PE and the common electrode CE by the voltage level difference between the data voltage and the common voltage. Liquid crystal molecules of the liquid crystal layer 420 are driven by the electric field generated between the pixel electrode PE and the common electrode CE. Light transmittance is adjusted by the liquid crystal molecules driven by the formed electric field, so that an image may be displayed.

In an exemplary embodiment, a storage voltage with a predetermined voltage level may be applied to the storage line, but the invention is not limited thereto. In an alternative exemplary embodiment, the storage line may receive the common voltage. The storage capacitor Cst functions to maintain the voltage charged to the liquid crystal capacitor Clc.

Figure 3:
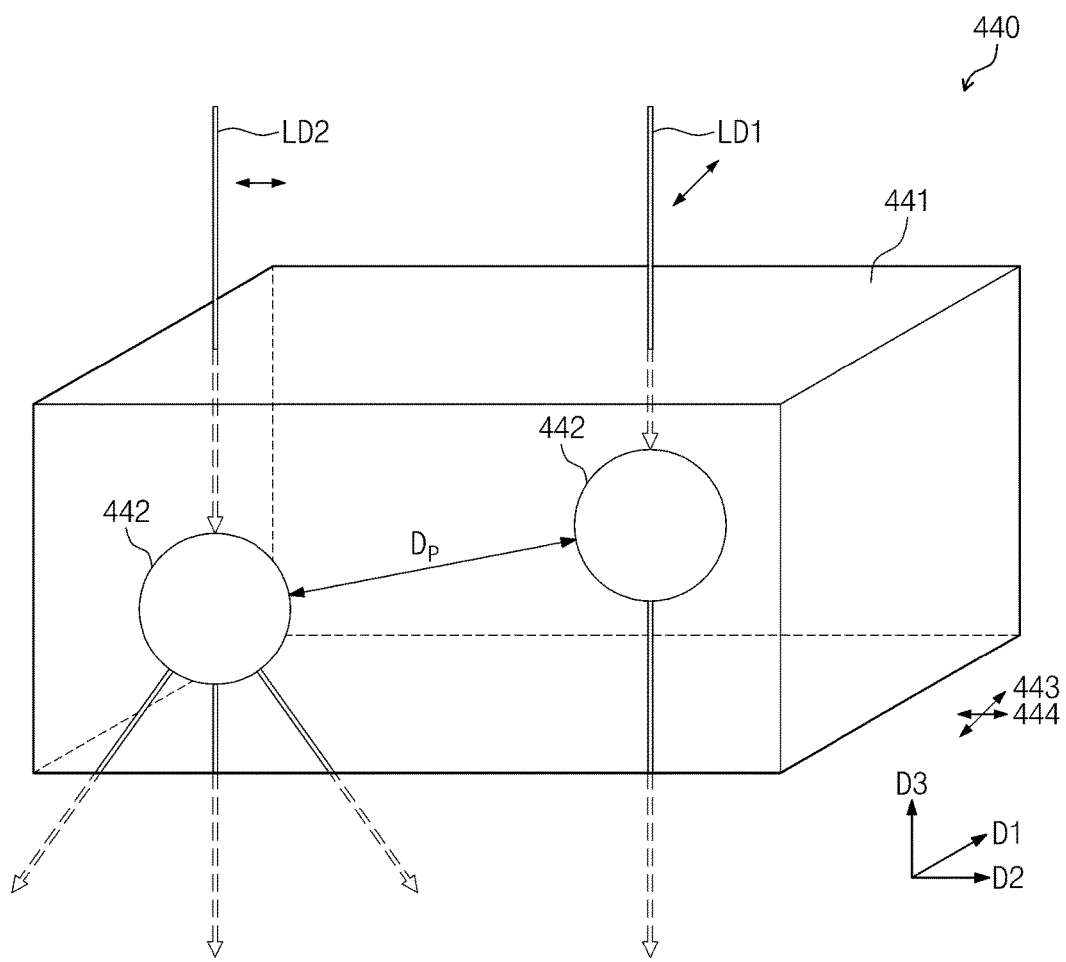
FIG. 3 is a partial enlarged perspective view of an exemplary embodiment of an anisotropic diffuser illustrated in FIG. 1.

FIG. 3 is a partial enlarged perspective view of an exemplary embodiment of an anisotropic diffuser illustrated in FIG. 1.

Referring to FIG. 3, in an exemplary embodiment of the anisotropic diffuser, the base 441 may respectively have first to third base refractive indices nb1, nb2 and nb3 in the first and second directions D1 and D2 and a third direction D3 perpendicular to the first and second directions D1 and D2. Herein, the third direction D3 may be the thickness direction of the display panel 400.

The diffusing particles 442 may respectively have first to third particle refractive indices np1, np2 and np3 in the first to third directions D1 to D3. In an exemplary embodiment of the invention, the first and third particle refractive indices np1 and np3 may be substantially the same as the first and third base refractive indices nb1 and nb3. In an alternative exemplary embodiment, the second particle refractive index np2 may be different from the second base refractive index nb2.

In an exemplary embodiment of the invention, the base 441 may have an isotropic refractive index. Accordingly, the first to third base refractive indices nb1, nb2 and nb3 may be substantially the same as each other and may be a first refractive index. In such an embodiment, the diffusing particles 442 may have anisotropic refractive indices. In such an embodiment, the first and third particle refractive indices np1 and np3 may be the first refractive index n1, and the second particle refractive index np2 may be a second refractive index n2 different from the first refractive index n1.

When the diffusing particles 442 are periodically arranged, constructive and destructive interference of light may occur by the diffusing particles 442. However, in an exemplary embodiment, the diffusing particles 442 may be randomly dispersed in the base 441. Accordingly, in such an embodiment, constructive and destructive interference of the incident light by the diffusing particles 442 does not occur. In an exemplary embodiment, the distances Dp between the diffusing particles 442 may be in a range of about 1 micrometer (μm) to about 1000 μm. In such an embodiment, the diameters of the diffusing particles 442 may be in a range of about 100 nanometers (nm) to about 100 μm.

When a first polarized light LD1, which is linearly polarized in the first direction D1, is incident to the anisotropic diffuser 440, the first polarized light LD1 is not refracted or scattered but transmitted through the anisotropic diffuser 440. This is because the first base refractive index nb1 and the first particle refractive index np1 are the same as each other in the first direction D1, and thus the first polarized light LD1 does not experience the border between the media for generating refraction or scattering.

In an exemplary embodiment, when a second polarized, which is light LD2 polarized in the second direction D2, is incident to the anisotropic diffuser 440, the second polarized light LD2 is refracted or scattered and transmitted through the anisotropic diffuser 440. This is because the second base refractive index nb2 and the second particle refractive index np1 are different from each other, and thus the second polarized light LD2 experiences the borders (the borders between the diffusing particles 442 and the base) between the media for generating refraction or scattering.

Thus, the anisotropic diffuser 440 transmits the light polarized parallel to the transmission axis 443, and scatters the light polarized parallel to the diffusing axis 444.

Figure 4:
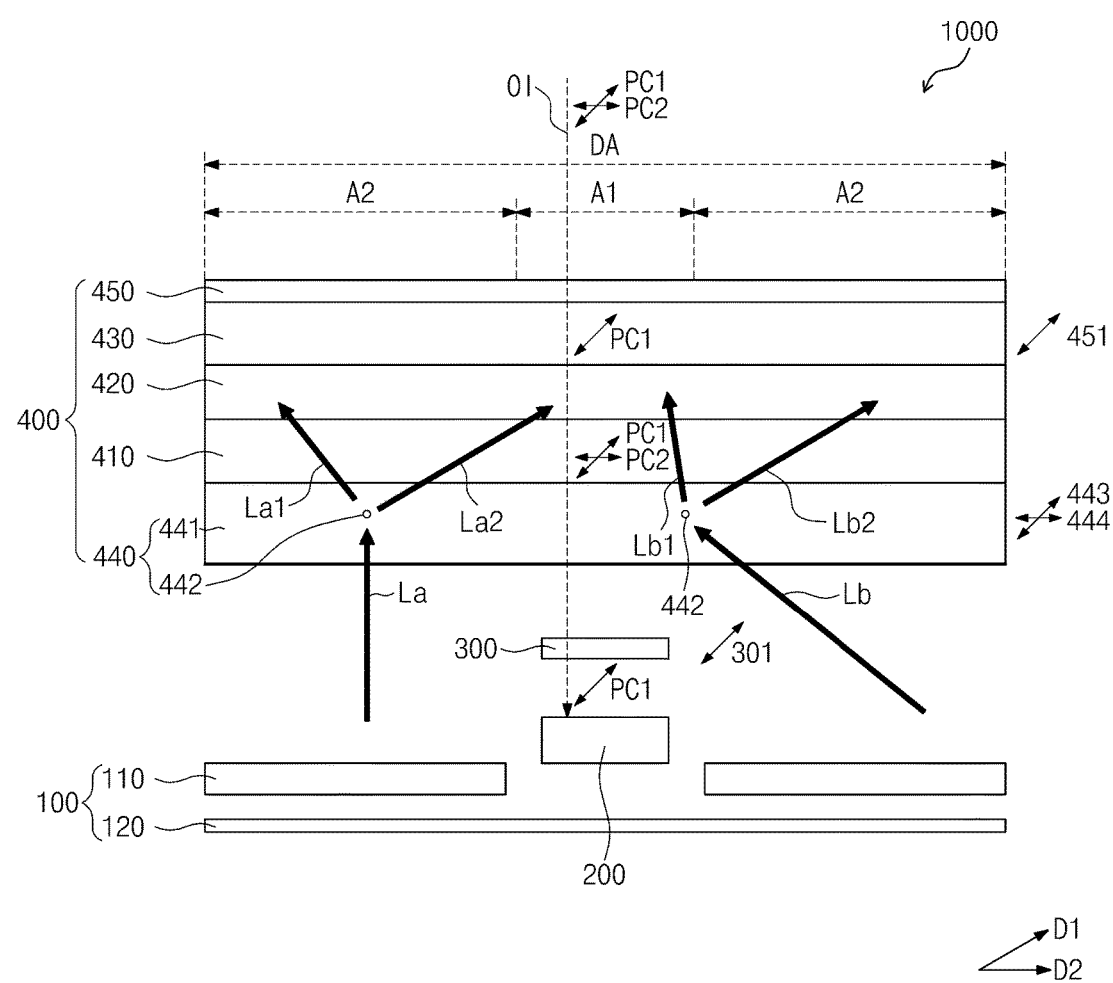
FIG. 4 is a cross-sectional view illustrating an operation of an exemplary embodiment of the display apparatus illustrated in FIG. 1.

FIG. 4 is a cross-sectional view illustrating an operation of an exemplary embodiment of the display apparatus illustrated in FIG. 1. In FIG. 4, the operation of the display apparatus is described through lights La and Lb, among the first light L1, propagating toward a specific region.

Referring to FIG. 4, among the first light L1, the first light La incident to the diffusing particles 442 dispersed in the second region A2 is scattered by the diffusing particles 442. More specifically, a portion La1 of the first light La reaches the liquid crystal layer 420 corresponding to the second region A2, and another portion La2 of the light La may reach the liquid crystal layer 420 corresponding to the first region A1.

Also, among the first light L1, the first light Lb incident to the diffusing particles 442 dispersed in the second region A2 is scattered by the diffusing particles 442. More specifically, a portion Lb1 of the first light Lb reaches the liquid crystal layer 420 corresponding to the first region A1, and another portion Lb2 of the first light Lb2 may reach the liquid crystal layer 420 corresponding to the second region A2.

Thus, the diffusing particles 442 are also provided to the first region A1 at which the capturing unit 200 is disposed as well as to the second region A2. Since the first lights La and Lb are also diffused by the diffusing particles 442 dispersed in the first region A1 as well as by the diffusing particles 442 dispersed in the second region A2, generation of a dark portion by the brightness difference between the first and second regions A1 and A2 may be effectively prevented.

In an exemplary embodiment, an image OI of the subject includes first and second polarized components PC1 and PC2 before being incident to the display panel 400. The first and second polarized components PC1 and PC2 are the components of the image OI of the subject parallel to the first and second directions D1 and D2, respectively.

When transmitted through the polarizing plate 450, the image OI of the subject is polarized in the first direction D1 and includes only the first polarized component PC1. Then, while the image OI of the subject is transmitted through the liquid crystal layer 420, the polarized light of the image OI of the subject is varied. As a result, the image OI of the subject incident to the anisotropic diffuser 440 may again include the first and second polarized components PC1 and PC2.

The first polarized component PC1 of the image OI of the subject, which reaches the anisotropic diffuser 440, is transmitted through the anisotropic diffuser 440 and the capture polarizing plate 300 and reaches the capturing unit 200.

In such an embodiment, the second polarized component PC2 of the image OI of the subject, which reaches the anisotropic diffuser 440, is scattered by the anisotropic diffuser 440. The second polarized component PC2 of the scattered image OI of the subject is blocked by the capture polarizing plate 300 and thus may not reach the capturing unit 200. More specifically, since the second polarized component PC2 is perpendicular to the transmission axis 443 of the capture polarizing plate 300, and thus absorbed and reflected by the capture polarizing plate 300.

As a result, the image OI of the subject reaching the capturing unit 200 is formed of only the first polarized component PC1 which is propagated without scattering. Accordingly, the image OI of the subject may reach the capturing unit 200 without being blurred or distorted, and as a result, a clear image may be captured by the capturing unit 200.

In such an embodiment, since the transmittance of the display panel 400 is low, the capturing unit 200 is effectively prevented from being seen by the reflected external light. In one exemplary embodiment, for example, the transmittance of the display panel 400 is about 10%. Accordingly, when external light incident to the polarizing plate 450 from a front side of the display panel 400 is sequentially transmitted through the polarizing plate 450 and the display panel 400, the strength (or intensity) of the external light is decreased to about 10% or less with respect to the original strength. Also, when the external light is reflected by the capturing unit 200 and is again transmitted through the display panel 400 and the polarizing plate 450, the strength of the external light is decreased to about 1% or less with respect to the original strength. Thus, since the strength of the external light reflected by the capturing unit 200 is very small, a user seeing the display panel may not see the capturing unit 200 through the external light reflected by the capturing unit 200.

Figure 5:
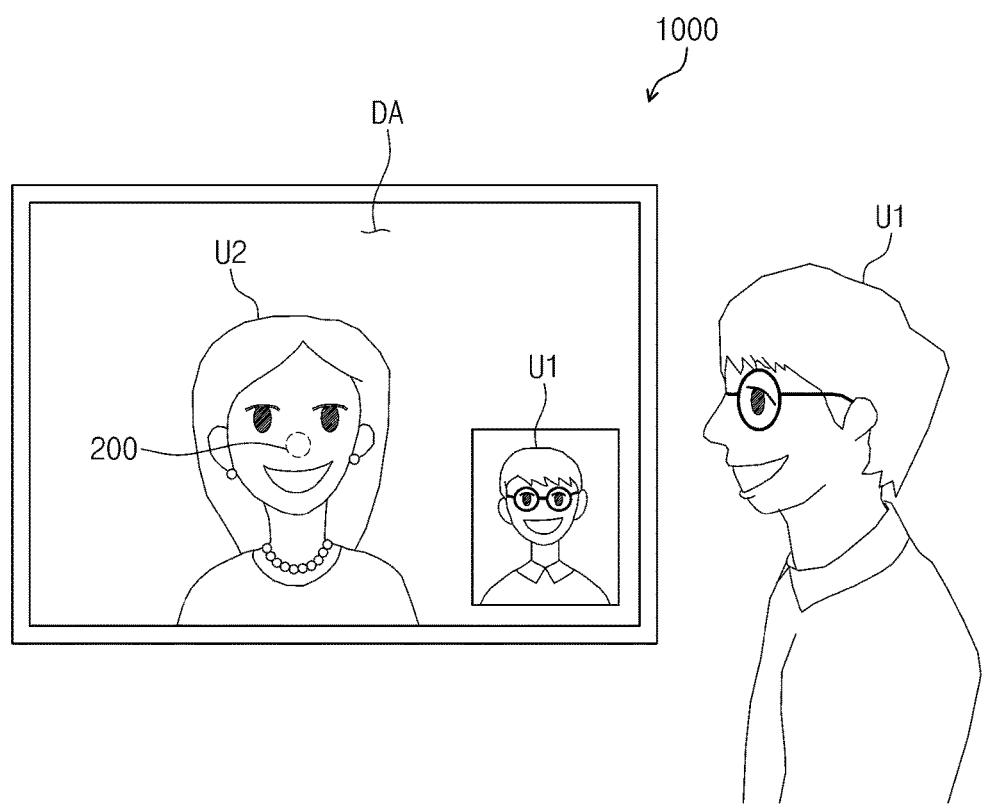
FIG. 5 is a view illustrating a user using an exemplary embodiment of a display apparatus according to the invention.

FIG. 5 is a view illustrating a user using an exemplary embodiment of a display apparatus according to the invention.

Referring to FIG. 5, a first user U1 performs eye-to-eye communication with a second user U2 through a display apparatus 1000. The first user U1 may perform a video call while watching the capturing unit 200 in a display region DA. The first user U1 may view an image of the second user U2 displayed on the display region DA. When the first user U1 views the image of the second user U2, since a viewing line of the first user U1 is directed toward the capturing unit 200, the viewing line of the first user U1 is directed toward the front in the image of the first user U1 captured by the capturing unit 200. Accordingly, the first and second users U1 and U2 may experience eye-to-eye communication in which a conversation is performed while practically looking at each other eye to eye through the display apparatus 1000.

Figure 6:
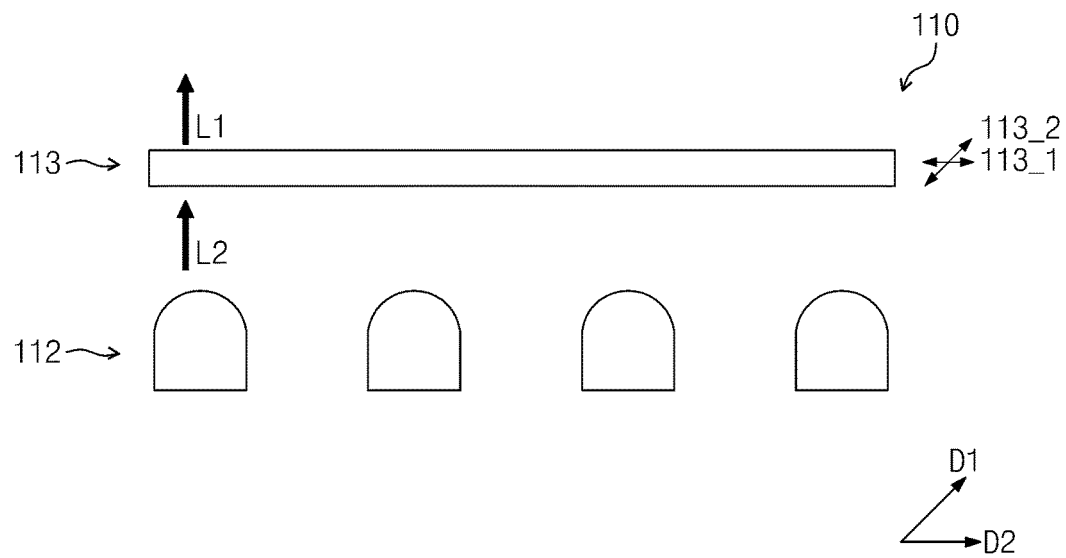
FIG. 6 is a view illustrating an exemplary embodiment of a light source unit according to the invention.

FIG. 6 is a view illustrating an exemplary embodiment of a light source unit according to the invention.

Referring to FIG. 6, an exemplary embodiment of a light source unit 110 includes a light source 112 and a polarizing unit 113.

The polarizing unit 113 is interposed between the anisotropic diffuser 440 (see FIG. 1) and the light source 112.

The light source 112 emits a second light L2 to an upper side. The light source 112 may be, for example, a light emitting diode ("LED"). In an exemplary embodiment of the invention, the light source 112 may be a white LED that emits white light, but the invention is not limited thereto. In an alternative exemplary embodiment, the light source 112 may be at least one selected from red, green, blue, cyan, magenta and yellow LEDs that emit red, green, blue, cyan, magenta and yellow light, respectively, and a combination thereof.

The light source may be disposed, e.g., mounted, on a light source driving substrate (not shown), for example, in a matrix shape. The light source driving substrate may be, for example, in a shape of rod extending in a predetermined direction. In such an embodiment, the light source driving substrate with the rod shape is provided in plural, and the light sources 112 are provided, while defining an array, to the light source driving substrate along the predetermined direction.

The polarizing unit is interposed between the light source 112 and a display panel 400. The polarizing unit 113 includes a second polarizing axis 111 parallel to a second direction D2. The polarizing unit 113 receives the second light L2 from a lower surface of the polarizing unit 113, and transmits only a component of the second light L2 parallel to the second direction, and thus polarizes the second light L2 to the first light L1.

In an exemplary embodiment, the polarizing unit 113 may be, for example, a reflective polarizing plate. In one exemplary embodiment, the reflective polarizing plate may include, for example, a dual brightness enhancement film ("DBEF"). In such an embodiment, the polarizing unit 113 includes a transmission axis 113_1 parallel to the second direction D2 and a reflective axis 113_2 parallel to the first direction D1. The reflective polarizing plate receives the second light L2, transmits only a component of the second light L2 polarized parallel to the transmission axis 113_1, and reflects a component polarized parallel to the reflective axis 113_2.

In an alternative exemplary embodiment, the polarizing unit 113 may be a general polarizing plate such as the first polarizing plate 450 (see FIG. 1). Accordingly, the polarizing unit 113 may be manufactured by adsorbing iodine, which is a dichromatic pigment or a dichromatic dye, to a polyvinyl alcohol based resin film, and then stretching and aligning the resin film in a stretching direction.

Figure 7:
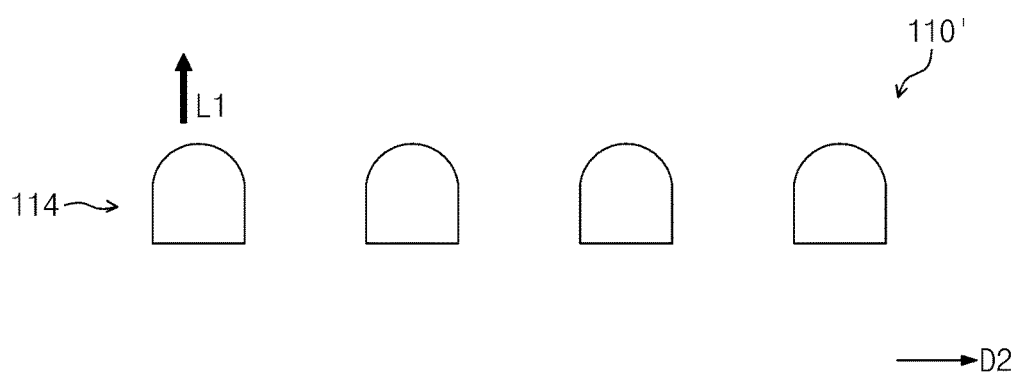
FIG. 7 is a view illustrating an alternative exemplary embodiment of a light source unit according to the invention.

FIG. 7 is a view illustrating an alternative exemplary embodiment of a light source unit according to the invention.

Referring to FIG. 7, a light source unit 110' may include a plurality of polarizing light sources 114. The polarizing light sources 114 are disposed to be spaced a predetermined distance from each other in one direction. Each of the polarizing light sources 114 generates a first light L1 linearly polarized parallel to a second direction D2. The polarizing light sources 114 may be, for example, light emitting diodes including a GaN based nitride semiconductor. A polarization ratio of the first light L1 is about 0.8 or more, and the polarization ratio may be determined by crystallinity of the nitride semiconductor or the like.

Figure 8:
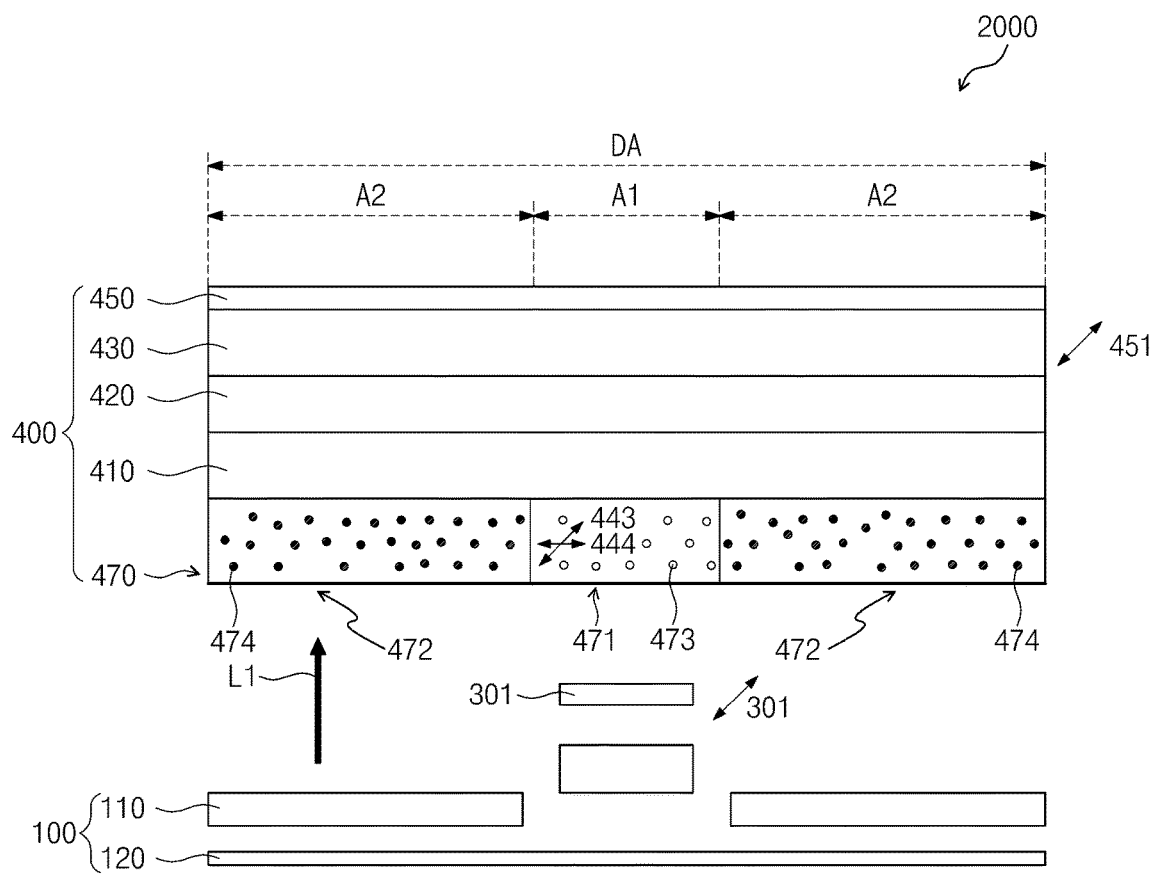
FIG. 8 is a cross-sectional view of an exemplary embodiment of a display apparatus according to the invention.

FIG. 8 is a cross-sectional view of an alternative exemplary embodiment of a display apparatus according to the invention.

The display apparatus 2000 illustrated in FIG. 8 is substantially the same as the display apparatus 1000 illustrated in FIGS. 1 to 5 except the anisotropic diffuser. The same or like elements shown in FIG. 8 have been labeled with the same reference characters as used above to describe the exemplary embodiments of the display apparatus shown in FIGS. 1 to 5, and any repetitive detailed description thereof will hereinafter be omitted or simplified.

Referring to FIG. 8, in an exemplary embodiment, an anisotropic diffuser 470 includes an anisotropic region 471 and an isotropic region 472. The anisotropic region 471 is defined to correspond to a first region A1, and the isotropic region 472 is defined to correspond to a second region A2.

The anisotropic region 471 includes first diffusing particles 473, and the isotropic region 472 includes second diffusing particles 474. The first and second diffusing particles 473 and 474 have refractive indices different from each other.

In an exemplary embodiment of the invention, the first diffusing particles 473 may be the same as the diffusing particles 442 illustrated in FIG. 3. In such an embodiment, the first diffusing particles 473 may respectively have first to third particle refractive indices np1, np2 and np3 in first to third directions D1 to D3. That is, the first and third particle refractive indices np1 and np3 of the first diffusing particles 473 in the first and third directions D1 and D3 may be a first refractive index n1, and the second particle refractive index np2 may be a second refractive index n2.

The second diffusing particles 474 may respectively have fourth to sixth particle refractive indices np4, np5 and np6 in the first to third directions D1 to D3. The fourth to sixth particle refractive indices np4, np5 and np6 are different from the first refractive index n1. In an exemplary embodiment of the invention, the second diffusing particles 474 may have isotropic refractive indices. In such an embodiment, the fourth to sixth particle refractive indices np4, np5 and np6 are the same as each other. In one exemplary embodiment, for example, the fourth to sixth particle refractive indices np4, np5 and np6 may each be a third refractive index n3.

The anisotropic region 471 includes a transmission axis 443 and a diffusing axis 444 determined by the first diffusing particles 473. Accordingly, the anisotropic region 471 scatters only a component polarized parallel to the diffusing axis 444 among a received first light L1. In such an embodiment, since the second diffusing particles 474 of the isotropic region 472 may scatter all components polarized in random directions, all the components of the received first light L1 may be scattered. Accordingly, the diffusing degree of the isotropic region 472 including the second diffusing particles 474 is greater than the diffusing degree of the anisotropic region 471 including the first diffusing particles 473.

Thus, in such an embodiment, where the first diffusing particles 473 are disposed corresponding to (e.g., disposed to overlap when viewed from a front view) the first region A1, and the second diffusing particles 474 are disposed corresponding to the second region A2, the diffusing degree and brightness uniformity of the anisotropic diffuser 470 may be substantially improved.

Figure 9:
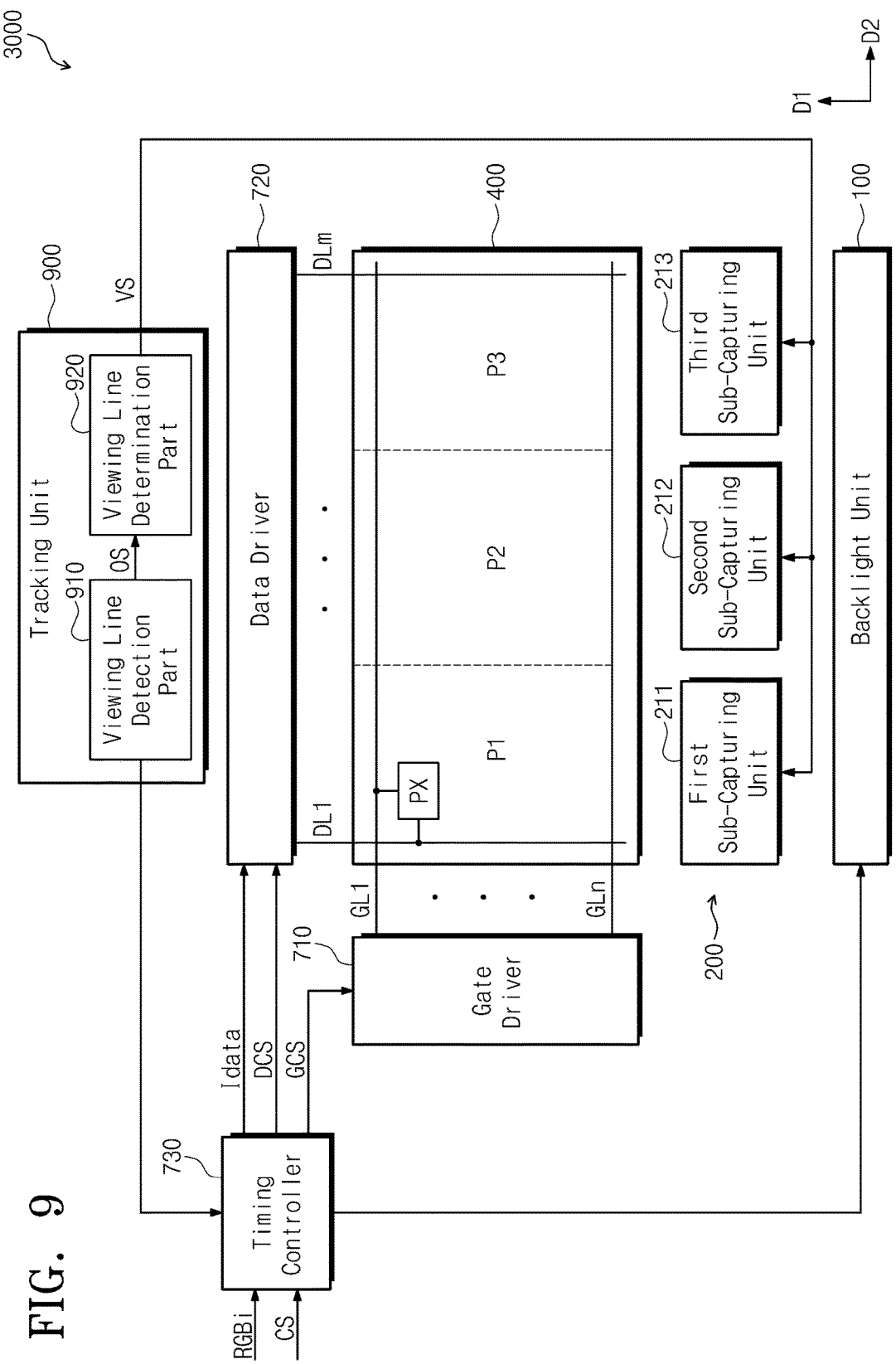
FIG. 9 is a block diagram of an alternative exemplary embodiment of a display apparatus according to the invention.
Figure 10:
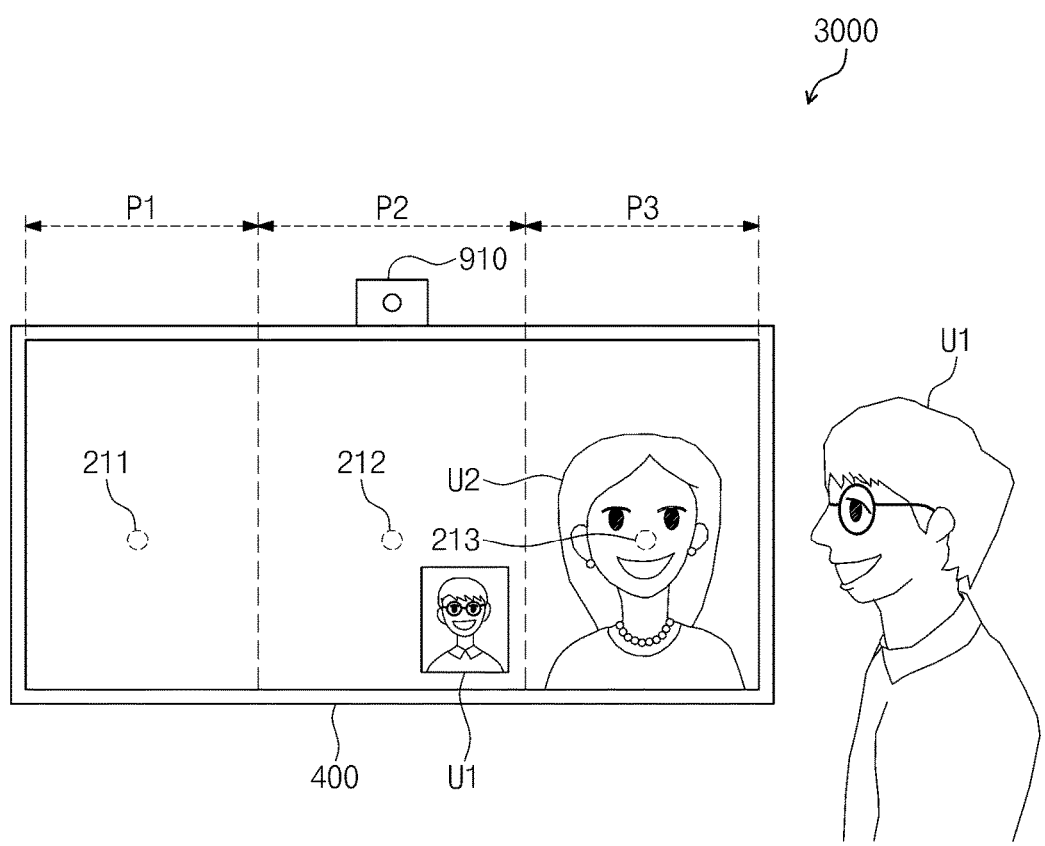
FIG. 10 is a view illustrating a user using a display apparatus illustrated in FIG. 9.

FIG. 9 is a block diagram of an alternative exemplary embodiment of a display apparatus according to the invention, and FIG. 10 is a view illustrating a user using the display apparatus illustrated in FIG. 9.

Referring to FIG. 9, an exemplary embodiment of a display apparatus 3000 includes a gate driver 710 and a data driver 720, which drive a display panel 400, and a control unit 730 that controls operations of the gate driver 710 and the data driver 720.

The control unit 730 receives input image information RGBi from the outside of the display apparatus 3000 and a plurality of control signals CS. The control unit 730 generates image data Idata by converting a data format of the input image information RGBi based on an interface of the data driver 720 and specifications of the display panel 400, and provides the image data Idata to the data driver 720.

In such an embodiment, the control unit 730 generates, based on the plurality of control signals CS, a data control signal DCS (for example, an output start signal, a horizontal start signal, etc.), and a gate control signal GCS (for example, a vertical start signal, a vertical clock signal, and vertical clock bar signal, etc.). The data control signal DCS is provided to the data driver 720, and the gate control signal GCS is provided to the gate driver 710.

The gate driver 710 sequentially outputs gate signals in response to the gate control signal GCS provided from the control unit 730.

The data driver 720 converts the image data Idata to data voltages in response to the data control signal DCS provided from the control unit 730, and outputs the data voltages to the display panel 400.

The display panel includes a plurality of pixels PX. A pixel PX is an element that displays a basic unit image constituting an image, and a resolution of the display panel 400 may be determined by the number of pixels PX provided to the display panel 400. In FIG. 9, only one pixel PX is illustrated and the illustration of the remaining pixels is omitted for convenience of illustration.

Each of the pixels PX may express one of the primary colors. The primary colors may include red, green, blue, and white, but not being limited thereto. In an alternative exemplary embodiment, the primary colors may include various colors such as yellow, cyan and magenta.

The display panel 400 may further include a plurality of gate lines GL1 to GLn and a plurality of data lines DL1 to DLm.

The gate lines GL1 to GLn extend in a second direction D2 and are arranged parallel to each other in a first direction D1. The gate lines GL1 to GLn are connected to the gate driver 710, and sequentially receive the gate signals from the gate driver 710.

The data lines DL1 to DLm extend in the first direction D1 and are arranged parallel to each other in the second direction D2. The data lines DL1 to DLm are connected to the data driver 720 and receive the data voltages from the data driver 720.

The pixels PX may be connected, to be driven, to a corresponding gate line among the plurality of gate lines GL1 to GLn and a corresponding data line among the plurality of data lines DL1 to DLm, and the pixels PX may be turned on or off by the gate signal applied thereto. The turned-on pixels PX display grayscales corresponding to the data voltages applied thereto.

The control unit 730 may be disposed, e.g., mounted, on a printed circuit board in the form of an integrated circuit chip and connected to the gate driver 710 and the data driver 720. The gate driver 710 and the data driver 720 may be formed of a plurality of driving chips and connected to the display panel 400 through a tape carrier package ("TCP") method. However, the invention is not limited thereto.

In an alternative exemplary embodiment, the gate driver 710 and the data driver 720 may be formed of a plurality of driving chips and mounted on the display panel 400 through a chip-on-glass ("COG") method. In an alternative exemplary embodiment, the gate driver 710 may be simultaneously formed together with transistors of the pixels PX and mounted to the display panel 400 in the form of an amorphous silicon thin film transistor gate driver circuit ("ASG").

The control unit 730 may output a backlight control signal BCS to a backlight unit 100 to control the backlight unit 100.

A display part of the display panel 400 may be divided into first to third parts P1 to P3. The first to third parts P1 to P3 may respectively correspond to three parts into which the display part is subdivided along a lateral direction.

A capturing unit 200 may include first to third sub-capturing units 211 to 213. The first to third sub-capturing units 211 to 213 may be respectively disposed corresponding to central portions of the first to third parts P1 to P3.

However, the invention is not limited thereto. In an alternative exemplary embodiment, the capturing unit 200 may be variously provided. In one alternative exemplary embodiment, for example, the capturing unit 200 may include four or more sub-capturing units, and the sub-capturing units may be disposed in each display part in a matrix shape.

In an exemplary embodiment, the display apparatus 3000 may include a tracking unit 900 including a viewing line detection part 910 and viewing line determination part 920.

The viewing line detection part 910 may detect a viewing line of a user. The viewing line detection part 910 generates a viewing line signal OS having information on the detected viewing line. The viewing line signal OS may include information on an eye position, a viewing line position, and/or viewing line direction.

In one exemplary embodiment, for example, face modeling technology may be applied to implement the viewing line detection part 910. The face modeling technology is an analysis procedure in which a face image captured by a capturing unit is processed and is converted into digital information for transmission, and an active shape modeling ("ASM") method, an active appearance modeling ("AAM") method, or the like may be used. In an exemplary embodiment, the viewing line detection part 910 may determine a motion of an eyeball by using an image of an identified eyeball. The viewing line detection part 910 may detect a direction at which a user stares by using the motion of an eyeball, and determine a region at which the user stares by comparing previously stored information on the display panel 400 and the direction at which the user stares.

The viewing line determination part 920 receives the viewing line signal OS, determines a viewing line of a user based on the viewing line signal OS, and generates a viewing signal VS. The viewing signal VS includes information on a part which the user views among the first to third parts P1 to P3 (hereinafter, referred to as viewing part of the user).

The first to third sub-capturing units 211 to 213 receive the viewing signal VS and are driven based on the viewing line information of the viewing signal VS. In one exemplary embodiment, for example, the first sub-capturing unit 211 captures the user U1 in response to the viewing signal VS when the user views the first part P1. In such an embodiment, the second and third sub-capturing units 212 and 213 may not capture the user.

In an exemplary embodiment, the second sub-capturing unit 212 captures the user in response to the viewing signal VS when the user views the second part P2. In such an embodiment, the first and third sub-capturing units 211 and 213 may not capture the user.

In an exemplary embodiment, the third sub-capturing unit 213 captures the user in response to the viewing signal VS when the user views the third part P3. In such an embodiment, the first and second sub-capturing units 211 and 212 may not capture the user.

When the size of the display apparatus 3000 is large, a viewing line of the user may differ according to which part of the first to third parts P1 to P3 the user views.

As illustrated in FIG. 10, when a first user U1 views an image of a second user U2 displayed in the third part P3, the third sub-capturing unit 213 captures an image of the first user U1. When the first user U1 views the image of the second user U2, since the viewing line of the first user U1 is directed toward the third sub-capturing unit 213, the viewing line of the first user U1 is directed toward the front in the image of the first user U1 captured by the third sub-capturing unit 213.

Accordingly, in such an embodiment, the first and second users U1 and U2 may experience eye-to-eye communication in which a conversation is performed while practically looking at each other eye to eye through the display apparatus 3000.

Thus, in such an embodiment, where the first to third sub-capturing units 211 to 213 are provided to the display panel 400, and the first to third sub-capturing units 211 to 213 are driven based on the viewing line of the first user U1, and thus the first user U1 may perform eye-to-eye communication.

While exemplary embodiments are described above, a person skilled in the art may understand that many modifications and variations may be made without departing from the spirit and scope of the invention defined in the following claims.

What is claimed is:

1. A display apparatus comprising:
    a display panel comprising:
    a polarizing plate having a first polarizing axis parallel to a first direction;
    an anisotropic diffuser comprising an anisotropic region having at a same time a transmission axis parallel to the first direction and a diffusing axis parallel to a second direction perpendicular to the first direction; and
    a liquid crystal layer interposed between the polarizing plate and the anisotropic diffuser;
    a backlight unit disposed at a rear side of the anisotropic diffuser, wherein the backlight unit generates a first light linearly polarized in the second direction; and
    a capturing unit disposed at a rear side of the anisotropic region, wherein the capturing unit captures an image of a subject at a front side of the display panel.

2. The display apparatus of claim 1, wherein
    the polarizing plate transmits the image of the subject polarized in a direction parallel to the transmission axis to the anisotropic diffuser side, and
    the anisotropic diffuser transmits the image of the subject polarized in the direction parallel to the transmission axis to the capturing unit and diffuses a component of the first light received from the backlight unit, which is polarized parallel to the diffusing axis, to provide the diffused light to the liquid crystal layer.

3. The display apparatus of claim 2, wherein
    the display panel further comprises a non-display part and a display part which displays an image and corresponds to a display region, and
    the capturing unit is disposed corresponding to the display region.

4. The display apparatus of claim 3, wherein
    the anisotropic region comprises a base and a plurality of first diffusing particles,
    the base has first to third base refractive indices in the first and second directions and a third direction, which is perpendicular to the first and second directions,
    the first diffusing particles respectively have first to third particle refractive indices in the first to third directions,
    the first and third particle refractive indices are substantially the same as the first and third base refractive indices, and
    the second particle refractive index is different from the second base refractive index.

5. The display apparatus of claim 4, wherein
    the base has an isotropic refractive index, and
    the first to third base refractive indices are substantially the same as each other.

6. The display apparatus of claim 5, wherein the first diffusing particles are randomly dispersed in the base.

7. The display apparatus of claim 6, wherein distances between the diffusing particles are in a range of about 1 micrometer to about 1000 micrometers.

8. The display apparatus of claim 7, wherein diameters of the first diffusing particles are in a range of about 100 nanometers to about 100 micrometers.

9. The display apparatus of claim 4, wherein
    the capturing unit overlaps the anisotropic region when viewed from a front view, and
    the anisotropic region is defined to correspond to a first region of the display region.

10. The display apparatus of claim 9, wherein
    the diffusing plate comprises an isotropic region defined to correspond to a second region of the display region, which is not overlapping the first region,
    the isotropic region further comprises a plurality of second diffusing particles, and
    refractive indices of the second diffusing particles are different from refractive indices of the first diffusing particles.

11. The display apparatus of claim 10, wherein
    each of the second diffusing particles respectively has fourth to sixth particle refractive indices in the first to third directions, and
    the fourth to sixth particle refractive indices are different from the first to third base refractive indices.

12. The display apparatus of claim 11, wherein the second diffusing particles have isotropic refractive indices.

13. The display apparatus of claim 10, wherein the second diffusing particles have refractive indices different from the base refractive indices in the first to third directions.

14. The display apparatus of claim 1, wherein
    the display panel further comprises:
    a non-display part; and
    a display part which displays an image and corresponds to a display region,
    the display part comprises a first part and a second part, and
    the capturing unit comprises:
    a first sub-capturing unit disposed to overlap the first part when viewed from a front view; and
    a second sub-capturing unit disposed to overlap the second part when viewed from the front view.

15. The display apparatus of claim 14, further comprising:
    a tracking unit comprising:
    a viewing line detection part which detects a viewing line of a user, and
    a viewing line determination part which generates a viewing signal comprising viewing information on a viewing part of the user between the first and second parts, based on the detected viewing line of the user,
    wherein the first and second sub-capturing units receive the viewing signal and are driven by the viewing signal.

16. The display apparatus of claim 15, wherein
    the first sub-capturing unit captures the image of the subject, when the user views the first part, in response to the viewing signal, and
    the second sub-capturing unit captures the image of the subject, when the user views the second part, in response to the viewing signal.

17. The display apparatus of claim 1, wherein the display panel comprises:

an upper plate interposed between the liquid crystal layer and the polarizing plate; and a lower plate interposed between the liquid crystal layer and the anisotropic diffuser, wherein the polarizing plate is disposed on an upper surface of the upper plate, and the anisotropic diffuser disposed on a lower surface of the lower plate.

18. The display apparatus of claim 1, further comprising:

a capture polarizing plate, which is disposed between the anisotropic diffuser and the capturing unit, wherein the capture polarizing plate overlaps the capturing unit when viewed from a front view, and the capture polarizing plate has a capture polarizing axis parallel to the first direction.

19. The display apparatus of claim 1, wherein the backlight unit comprises:

a light source which generates a second light; and a polarizing unit which has a second polarizing axis parallel to the second direction, receives the second light, and polarizes the second light to the first light.

20. The display apparatus of claim 1, wherein the backlight unit comprises a polarizing light source which generates the first light.

\* \* \* \* \*